UNITED STATES PATENT OFFICE.

ERNEST JOHN KNOWLTON, OF ANN ARBOR, MICHIGAN.

COMPOUND FOR WATERPROOFING FABRICS.

SPECIFICATION forming part of Letters Patent No. 517,927, dated April 10, 1894.

Application filed March 29, 1892. Serial No. 426,871. (No specimens.)

*To all whom it may concern:*

Be it known that I, ERNEST JOHN KNOWLTON, a citizen of the United States, residing at Ann Arbor, in the county of Washtenaw and State of Michigan, have invented certain new and useful Improvements in Compounds for Waterproofing Fabrics, &c., of which the following is a specification.

My invention relates to waterproof fabrics, and has reference more particularly to that class of waterproof fabrics used in the construction of portable bathing apparatus, such for instance as is shown in Reissue Letters Patent granted to me June 18, 1872, No. 4,949.

After years of experimentation with different materials I have devised a composition by means of which the sack or body of the bath apparatus may be made as durable and practically as good as a rubber coated sack, although it does not cost half as much as the latter, as rubber is very expensive. Oil cloth is cheap, but its tendency to crack has rendered it almost useless for water vessels. I overcome these objections by the composition which will now be described in detail. The sacks are to be made of any cloth equal in texture to good drilling or closely woven, fine, light ducking, and after making and putting them in the frames they are to be sized with a sizing of linseed mucilage (of about the consistency of thin starch used for laundry work) with a quarter of a pound of Spanish white mixed in one quart of the sizing. To produce this flax seed mucilage or linseed mucilage, as it is termed, I take two pounds of common flax seed and cook in about half a gallon of water until it reaches the consistency of common laundry starch. If the mucilage is too thick, add more water, and if too thin, add more seed. When cooked ready for use I strain out the seeds, mix in the Spanish white and use the liquid the same as ordinary starch. After the sacks have thus been sized, they are thoroughly dried, and then coated with a waterproofing material, preferably with a composition comprising half a gallon of raw linseed oil, thickened by dissolving a quarter of a pound of beeswax by or with heat, and half a pint of drier. I apply two or three coats of this composition to each sack, and sandpaper each coating after the sack has seasoned for a week or ten days.

The use of flax seed mucilage and Spanish white for filling the pores of the cloth in place of the common paste and other stock heretofore used, renders the composition less liable to dry out and crack than other compositions of which I am aware.

The proportions herein stated are those which I believe will give the best results, but I do not wish to limit myself to these exact proportions, as it is obvious that they may be varied as the experience and judgment of the workman shall dictate to suit different textures of cloth and different degrees of temperature in which the sack is cured.

While the invention is designed more particularly for coating fabrics for use in connection with my portable bathing apparatus, I do not wish to be understood as limiting or restricting myself to this use.

In lieu of the whiting, which is used to thicken the mucilage, I may employ ocher, ground chalk, soapstone or pumice stone.

Having thus described my invention, what I claim is—

A filling compound consisting of linseed mucilage and Spanish white, substantially in the proportions and for the purpose stated.

In witness whereof I hereunto set my hand in the presence of two witnesses.

ERNEST JOHN KNOWLTON.

Witnesses:
 JOHN D. BOYLAN,
 MINNIE A. BOYLAN.